(12) United States Patent
Lu et al.

(10) Patent No.: US 8,547,050 B2
(45) Date of Patent: Oct. 1, 2013

(54) CONTROL METHOD AND SYSTEM WITH FEEDBACK INDICATIVE OF LOAD FLUX

(75) Inventors: Haihui Lu, Shanghai (CN); David M. Messersmith, Kenosha, WI (US); Thomas A. Nondahl, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/473,985

(22) Filed: May 17, 2012

(65) Prior Publication Data

US 2012/0223668 A1  Sep. 6, 2012

Related U.S. Application Data

(63) Continuation of application No. 11/897,871, filed on Aug. 31, 2007, now Pat. No. 8,203,304.

(51) Int. Cl.
*G01P 3/00* (2006.01)
*H02P 1/28* (2006.01)

(52) U.S. Cl.
USPC ............ 318/779; 318/799; 318/461; 324/178

(58) Field of Classification Search
USPC .................. 318/727, 778, 779, 801, 805–809, 318/799, 461; 323/238, 321, 901; 388/917; 324/178
See application file for complete search history.

(56) References Cited

U.S. PATENT DOCUMENTS

| | | | |
|---|---|---|---|
| 4,013,937 A | 3/1977 | Pelly et al. | |
| 4,124,885 A | 11/1978 | Nordby | |
| 4,385,251 A | 5/1983 | Mallick et al. | |
| 4,405,873 A | 9/1983 | Nondahl | |
| 4,490,780 A | 12/1984 | Nondahl | |
| 4,581,696 A | 4/1986 | Gyugyi et al. | |
| 4,634,951 A * | 1/1987 | Kampf et al. | ................. 318/778 |
| 4,856,965 A | 8/1989 | Katsuie et al. | |
| 5,068,811 A | 11/1991 | Johnson et al. | |
| 5,187,419 A | 2/1993 | DeLange | |
| 5,347,277 A | 9/1994 | Nondahl et al. | |

(Continued)

OTHER PUBLICATIONS

Chapman, "Electric Machinery Fundamentals," Third Edition, McGraw-Hill Publishing, New York, 1999. Appendix A explains a three-phase circuit. Specifically, pp. 652-659 explains the relationship or a phase quantity and line quantity between a delta-circuit configuration and a Y-circuit configuration.

(Continued)

*Primary Examiner* — Eduardo Colon Santana
(74) *Attorney, Agent, or Firm* — Fletcher Yoder P.C.; William R. Walbrun; John M. Miller

(57) ABSTRACT

Systems, methods, and devices are disclosed, including an induction-motor controller having a phase path; a solid-state switch interposed on the phase path; and a controller coupled to the solid-state switch. In certain embodiments, the controller is configured to switch the solid-state switch so that the solid-state switch is conductive during a conduction angle of a cycle of an incoming AC power waveform conveyed by the phase path, calculate the conduction angle based on a generally sinusoidal reference value that has a frequency lower than a frequency of the incoming AC power waveform, and adjust the generally sinusoidal reference value based on a value indicative of flux in a load coupled to the phase path.

13 Claims, 9 Drawing Sheets

(56) References Cited

U.S. PATENT DOCUMENTS

| | | | |
|---|---|---|---|
| 5,510,687 A | 4/1996 | Ursworth et al. | |
| 5,859,514 A | 1/1999 | Chouffier et al. | |
| 5,886,893 A * | 3/1999 | Asai et al. | 363/161 |
| 6,038,155 A | 3/2000 | Pelly | |
| 6,172,498 B1 | 1/2001 | Schmidt et al. | |
| 6,218,749 B1 | 4/2001 | Nondahl et al. | |
| 6,351,397 B1 | 2/2002 | Sawa et al. | |
| 6,504,275 B2 | 1/2003 | Nondahl et al. | |
| 7,227,326 B1 | 6/2007 | Lu et al. | |
| 7,345,449 B2 | 3/2008 | Barie et al. | |
| 7,358,700 B2 | 4/2008 | Qian et al. | |
| 2003/0205989 A1 | 11/2003 | Garrigan et al. | |
| 2007/0046247 A1 | 3/2007 | Barie et al. | |
| 2007/0070557 A1 | 3/2007 | Maclennan et al. | |

OTHER PUBLICATIONS

SMC Plus, Smart Motor Controller: Preset Slow Speed Option Manual. (Bulletin 150) Allen-Bradley Publication 150-807US dated Oct. 1992.

SMC Plus, Smart Motor Controller: Accu-Stop Option Manual. (Bulletin 150) Allen-Bradley Publication 150-809US dated Oct. 1992.

Zhao Kaiqi, et al., "Discrete Variable Frequency Soft Starting on DSP-based Voltage Controller-Fed IM Drive," Industrial Electronics Society IECON'03, The 29th Annual of the IEEE, vol. 1, Nov. 2-6, 2003, pp. 758-763.

* cited by examiner

CONTROL METHOD AND SYSTEM WITH FEEDBACK INDICATIVE OF LOAD FLUX

CROSS-REFERENCE TO RELATED APPLICATIONS

This application is a continuation of U.S. patent application Ser. No. 11/897,871, filed Aug. 31, 2007, entitled "Control Method and System with Feedback Indicative of Load Flux", which is incorporated herein by reference in its entirety.

BACKGROUND

The invention relates generally to controllers and, more specifically, in certain embodiments, to induction-motor controllers.

In many applications, it is desirable to tailor electrical power to elicit a particular response from a load. The response of the load may be affected by a variety of electrical parameters, such as frequency, amplitude, phase angle, wave shape, and other aspects of time-varying electrical currents, and these parameters may be adjusted to achieve useful ends. For example, a particular frequency and amplitude of AC electrical power may be used to rotate an induction motor (or other type of motor) at a certain speed, in a certain direction, or with a certain torque. In some situations, however, the electrical power is received at a fixed, standard frequency waveform, such as 60 Hz from a wall outlet, and the desired load response corresponds to some other frequency or waveform (or other electrical parameter).

BRIEF DESCRIPTION

The present invention provides a motor control technique designed to respond to such issues. Some embodiments of the present technique provide for an induction-motor controller having a phase path; a solid-state switch interposed on the phase path; and a controller coupled to the solid-state switch. In certain embodiments, the controller is configured to switch the solid-state switch so that the solid-state switch is conductive during a conduction angle of a cycle of an incoming AC power waveform conveyed by the phase path, calculate the conduction angle based on a generally sinusoidal reference value that has a frequency lower than a frequency of the incoming AC power waveform, and adjust the generally sinusoidal reference value based on a value indicative of flux in a motor coupled to the phase path.

In another aspect, certain embodiments of the present technique provide a method for controlling an electric motor. This method includes pulse-width modulating generally sinusoidal AC power with a pulse width that varies based on a generally sinusoidally-varying reference value, providing a flux target, determining a flux, and adjusting the generally sinusoidally-varying reference value based on a difference between the stator flux target and the stator flux.

In another aspect, the present technique provides a method of applying electrical power. Some embodiments of the method include selectively transmitting a portion of cycles of AC power during a conduction angle of each cycle, where the conduction angle varies over time based on a generally sinusoidally-varying reference value. Embodiments also include controlling the generally sinusoidally-varying reference value based on feedback indicative of a parameter of a load.

DRAWINGS

These and other features, aspects, and advantages of the illustrated invention will become better understood when the following detailed description is read with reference to the accompanying drawings in which like characters represent like parts throughout the drawings, wherein.

DETAILED DESCRIPTION

Figure 1:
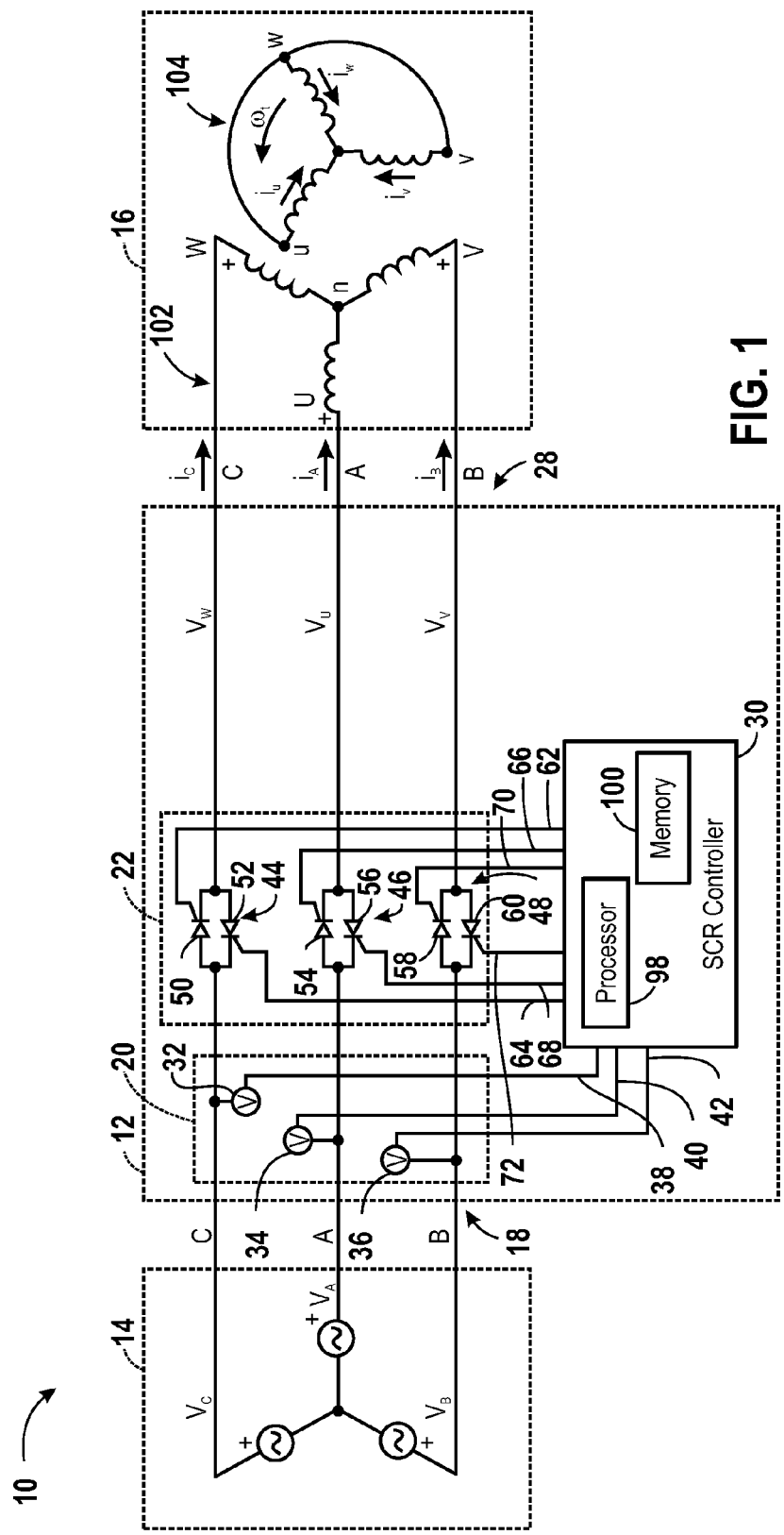
FIG. 1 illustrates an exemplary induction motor system in accordance with an embodiment of the present technique.

FIG. 1 depicts an example of an induction motor system 10 having a motor controller 12, a power supply 14, and an induction motor 16. As described further below, the illustrated controller 12 is capable of controlling various aspects of motor operation, such as speed and position, by selectively energizing one or more silicon-controlled rectifiers (SCRs). In some embodiments, the motor controller 12 may pulse-width modulate sinusoidal, input-power waveforms based on a lower-frequency reference or control waveform, thereby providing an output waveform with a frequency, phase, and amplitude tailored to a desired direction, speed, and torque. Prior to addressing the motor controller 12 in detail, the features of the power supply 14 will be explained.

The illustrated power supply 14 is a three-phase, 60 Hz power supply that outputs three sinusoidally varying voltages $V_A$, $V_B$, and $V_C$. Other embodiments may include power supplies 14 capable of outputting a different number of phases, a different frequency, and/or a different voltage waveform. In operation, currents driven by the voltages $V_A$, $V_B$, and $V_C$ flow through phase paths A, B, and C respectively between the power supply 14 and the motor controller 12.

The motor controller 12 of FIG. 1 is configured to accept and control currents driven by the three sinusoidally varying voltage waveforms $V_A$, $V_B$, and $V_C$ by selectively transmitting a portion of each voltage cycle. To accomplish this, the illustrated motor controller includes a power input 18, a supply-cycle monitor 20, a switching unit 22, a power output 28, and an SCR controller 30. The illustrated power input 18 continues the phase paths A, B, and C into the motor controller 12 from the power supply 14. The phase paths A, B, and C extend through the motor controller 12, and the power output 28 extends the phase paths A, B, and C out of the motor controller 12 to the induction motor 16.

The exemplary supply-cycle monitor 20 includes three voltage sensors 32, 34, and 36 coupled to each pair of the three phase paths A, B, and C. In the presently discussed embodiment, the voltage sensors 32, 34, and 36 couple to the phase paths A, B, and C between the power supply 14 and the switching unit 22. The illustrated voltage sensors 32, 34, and 36 are configured to sense line-to-ground voltages of the phase paths A, B, and C on the power supply 14 side of the switching unit 22. Other embodiments may sense line-to-line voltages or line currents. Supply voltage signals 38, 40, 42 communicatively couple the voltage sensors 32, 34, and 36 respectively to the SCR controller 30 and indicate the sensed voltages or the phase of the sensed voltages. The illustrated supply-cycle monitor 20 is integrated within the motor controller 12.

In other embodiments, a portion of the supply-cycle monitor 20 may be separate from motor controller 12 and, in some embodiments, integrated into the power supply 14. Further, some embodiments may include fewer voltage sensors 32, 34, or 36, such as two or one, which is not to suggest that other features discussed herein may not also be omitted. For instance, in embodiments having one voltage sensor 32 constituting the supply-cycle monitor 20, the SCR controller 30 may estimate the voltage of the non-sensed phases by adding or subtracting 120 degrees to the phase angle of a sensed voltage. Alternatively, or additionally, the supply-cycle monitor 20 may include other circuitry adapted to synchronize subsequently discussed operations of the SCR controller 30 with the cycle of the power supply 14.

Currents on the phase paths A, B, and C may be regulated by the exemplary switching unit 22, which includes solid-state switches, thryristors, or SCR pairs 44, 46, and 48 having SCRs 50 and 52, 54 and 56, and 58 and 60, respectively. In the illustrated embodiment, each SCR pair 44, 46, and 48 is serially disposed on one of the phase paths A, B, and C, respectively. Within each exemplary SCR pair 44, 46, and 48, SCRs 50 and 52, 54 and 56, and 58 and 60 are oppositely oriented and connected in parallel to the phase paths A, B, and C, respectively. Gate signals 62, 64, 66, 68, 70, and 72 connect the SCR controller 30 to a gate of each of the SCRs 50, 52, 54, 56, 58, and 60, respectively. While the illustrated embodiment does not employ an insulated gate bipolar transistor (IGBT) to modulate currents through the phase paths A, B, or C, other embodiments in accordance with the present technique may include IGBTs or other switching devices. For instance, in some embodiments, the switching unit 22 may include a matrix converter. SCRs and their supporting circuitry, however, are often less expensive.

The illustrated SCR controller 30 includes a processor 98 and memory 100. The processor 98, memory 100, and their respective sub-components may be partially or entirely integrated into a single device, or separately disposed. The processor 98 may include a microprocessor, a microcontroller, and/or a digital signal processor (DSP), for instance. The illustrated memory 100 may include volatile memory, such as dynamic random access memory (DRAM), and/or non-volatile memory, such as magnetic storage, optical storage, and/or flash memory, for instance. The processor 98 may communicatively couple to both the memory 100 and signals 38, 40, 42, 62, 64, 66, 68, 70, and 72.

The induction motor 16 of FIG. 1 is coupled to the motor controller 12 via phase paths A, B, and C. The illustrated induction motor 16 includes a stator 102 and a rotor 104. The stator 102 typically includes a stator core constructed from a plurality of steel laminations and a plurality of windings coupled to each pair of the phase paths A, B, and C through the motor terminals U, V, and W. The rotor 104 may also include a plurality of windings, for example in certain types of traction motors, or a number of bars (such as 36) connected by end rings, for instance in a squirrel-cage rotor. In some embodiments, the rotor 104 may include a cast core with copper bars and end rings. The rotor may be concentrically disposed within stator 102 and rotateably supported, for instance by bearings. In FIG. 1, the direction of rotation and an angular position of the rotor is indicated by the arrow labeled $\omega_r$.

In operation, alternating currents through each of the phase paths A, B, and C create a rotating magnetic field in the induction motor 16. Through electromagnetic induction, the rotating magnetic field induces a current in the conductors of the rotor 104, which in turn creates a counterbalancing magnetic field that causes the rotor 104 to turn in the direction the field is rotating. Generally, the rotor 104 turns slightly slower than the rotating magnetic field so that the magnetic field induces currents in the rotor winding to produce torque.

The motor controller 12 may modulate currents $i_A$, $i_B$, and $i_C$ conducted by phase paths A, B, and C to control the starting and/or stopping performance of the induction motor 16. As the voltages $V_A$, $V_B$, and $V_C$ oscillate, the SCR controller 30 energizes the gates of the SCRs 50, 52, 54, 56, 58, and 60 during the portion of the voltage cycle in which the SCRs 50, 52, 54, 56, 58, and 60 are forward biased. By waiting to energize the gates for some time delay (or firing angle) after the SCRs 50, 52, 54, 56, 58, and 60 become forward biased, the SCR controller 30 may increase or decrease the currents $i_A$, $i_B$, and $i_C$ on phase paths A, B, and C. Generally, a longer delay reduces the portion of each power supply cycle that drives currents $i_A$, $i_B$, or $i_C$, and a shorter delay increases the portion of each power supply cycle that drives currents $i_A$, $i_B$, or $i_C$. To energize the gates of SCRs 50, 52, 54, 56, 58, and 60, the SCR controller may drive a pulse of current on gate signals 62, 64, 66, 68, 70, 72. Once the gates are energized and current starts to flow in two or more of the SCRs 50, 52, 54, 56, 58, and 60, each conducting SCR will continue conducting current until the current falls to zero, at which point it turns off until the next time its gate is energized. Thus, in some embodiments, the SCR controller 30 may adjust the time during each cycle of the power supply 14 at which the SCR pairs 44, 46, and 48 are turned on to control the power delivered to the induction motor 16. For example, in some embodiments, the motor controller 12 may gradually decrease the firing angle of each SCR pair 44, 46, and 48 to soft-start the induction motor 16.

Figure 2:
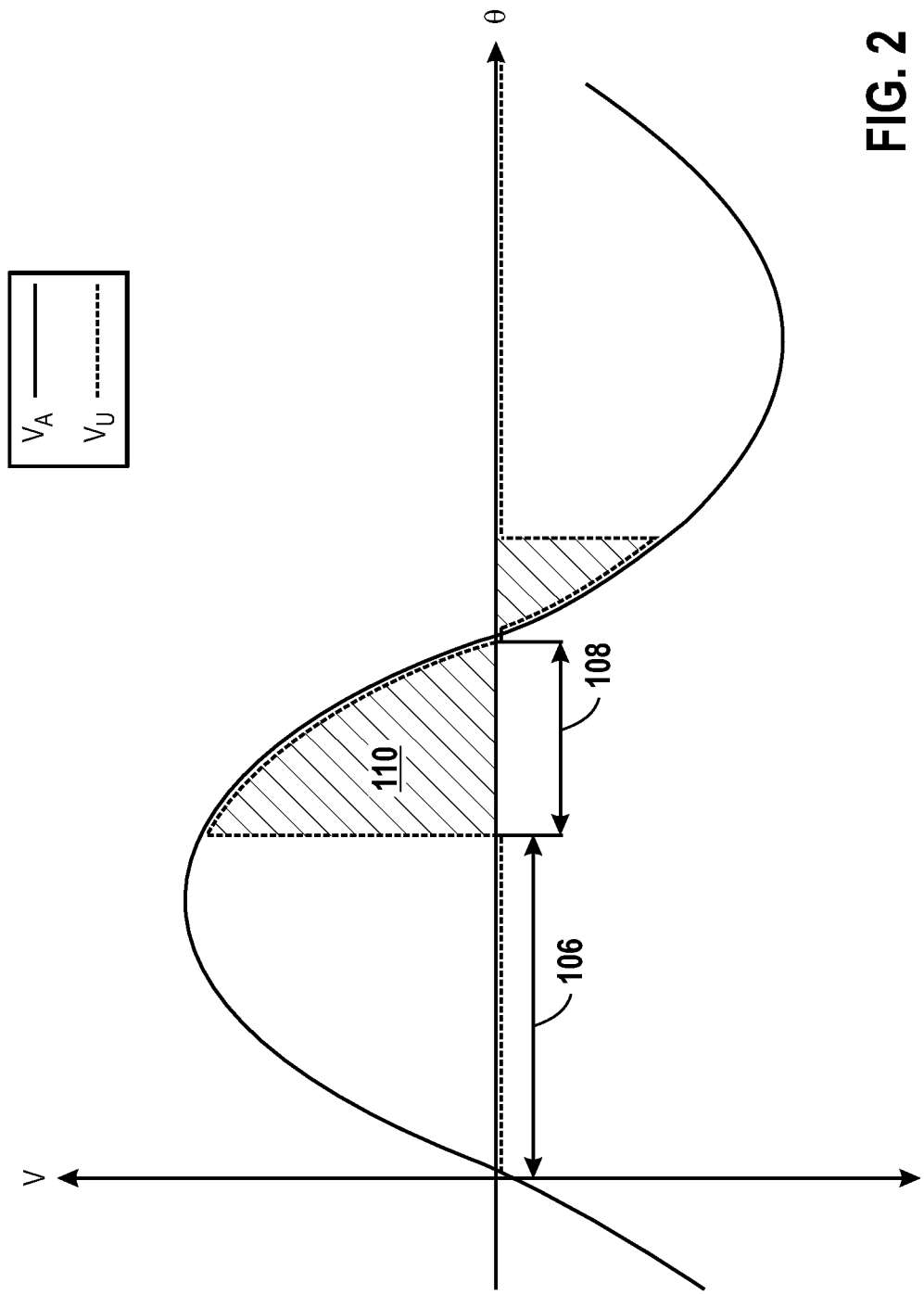
FIG. 2 illustrates one cycle of input and output voltage waveforms through a portion of the induction motor system of FIG. 1, in accordance with an embodiment of the present technique.

The operation of a single SCR 54 is illustrated by FIG. 2, which depicts input voltage $V_A$ and output voltage $V_U$ during a portion of a single cycle on phase path A. The abscissa of FIG. 2 corresponds to the phase angle of the input voltage $V_A$, i.e., 0, and the ordinate corresponds to voltage. As illustrated, the input voltage $V_A$ varies sinusoidally. The output voltage $V_U$, in the illustrated embodiment, is decoupled from the input voltage $V_A$ until the SCR 54 is energized at firing angle 106. After the SCR 54 is energized, it is conductive and remains so until current stops flowing, even if the firing voltage applied to its gate is removed. Consequently, after the SCR is turned on, $V_A$ is generally the same as $V_U$ until the SCR 54 becomes reverse biased and stops flowing current, at which point the SCR 54 turns off, thereby decoupling $V_A$ from $V_U$. The portion of each cycle during which the SCR is conductive is referred to as the conduction angle 108. The amount of volt-seconds conveyed through the SCR 54 corresponds to the area 110 defined by the curve of $V_U$. Thus, the volt-seconds applied to the motor 16 can be varied by increasing or decreasing the conduction angle.

Conduction angle adjustments can be used to provide output power with useful properties. For instance, by sinusoidally adjusting the conduction angle, a waveform of a desired frequency and amplitude can be provided, which can be used to drive the motor 16 to a desired position or velocity or with a desired torque. Thus, in some embodiments, the SCR controller 30 varies the conduction angle to control the operation of the motor 16.

Figure 3:
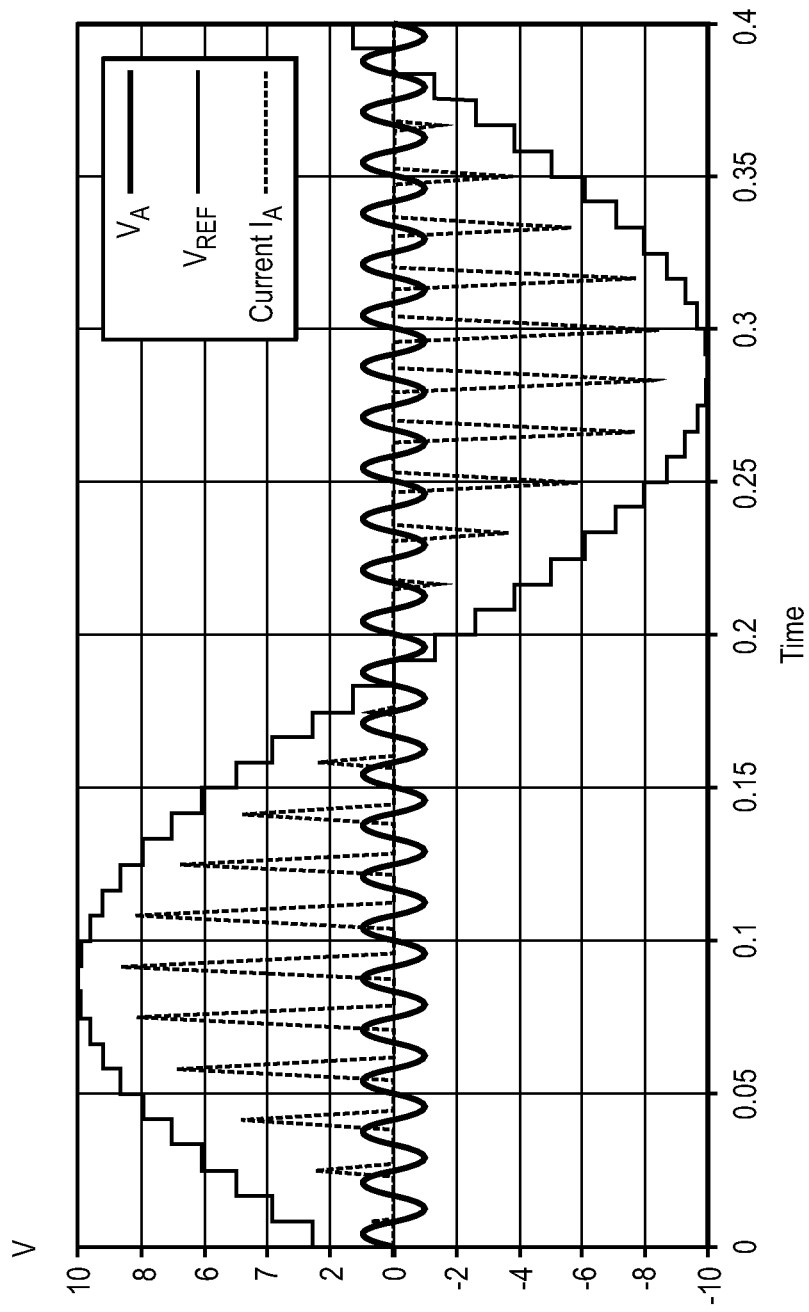
FIG. 3 illustrates voltages and currents in the induction motor system of FIG. 1 during a plurality of cycles, in accordance with an embodiment of the present technique.

FIG. 3 illustrates how some embodiments of the controller 30 (FIG. 1) control the motor 16. Specifically, FIG. 3 illustrates the relationship between a single phase voltage $V_A$, the phase current $I_A$, and a reference voltage $V_{REF}$ that modulates the conduction angle 108 (FIG. 2). It should be understood that, in FIG. 3, to clearly illustrate their relationship over time, $V_A$ and $V_{REF}$ are not drawn to the same voltage scale, since the peak magnitude of $V_A$, in some embodiments, is larger than $V_{REF}$. Because the reference voltage $V_{REF}$ controls the conduction angle 108, the frequency of the reference voltage $V_{REF}$ generally determines the motor speed, the amplitude of the reference voltage generally corresponds to motor torque, and the phase difference between the motor phase current and the reference voltage $V_{REF}$ determines the direction of the motor torque.

As illustrated by an examination of a single cycle of the phase voltage $V_A$ in FIG. 3, the controller 30 typically fires one of the two opposing SCRs in each SCR pair 44, 46, and 48 per cycle of the phase voltage $V_A$. In this embodiment, which SCR 54 or 56 is fired is generally determined by the sign of the reference voltage $V_{REF}$. If the reference voltage is positive, then the SCR 54 is fired at the appropriate firing angle when the phase voltage $V_A$ is positive, corresponding to the desired conduction angle, and if the reference voltage $V_{REF}$ is negative, then the SCR 56 is fired at the appropriate time when the phase voltage $V_A$ is negative. Thus, the sign of the reference voltage $V_{REF}$ may determine both which SCR 54 or 56 is fired and the half of the cycle of the phase voltage $V_A$ in which the SCR 54 or 56 is fired.

As indicated by the FIG. 3, over the cycle of the reference voltage $V_{REF}$, the reference voltage $V_{REF}$ modulates the phase current $I_A$. The larger of the magnitude of the reference voltage $V_{REF}$, the earlier the appropriate SCR 54 or 56 is fired, and the earlier the firing, the larger the conducting angle 108 and the larger the phase current $I_A$. The reference voltage can be mapped to a conducting angle with a variety of techniques, including the two examples described below.

In some embodiments, the conduction angle 108 is proportional to the reference voltage $V_{REF}$. Thus, the relationship between the conduction angle 108 and $V_{REF}$ may be expressed by the following equation (Equation 1), in which $\theta_{CA}$ represents the conduction angle and m and b represent constants that are empirically or analytically determined:

$$\theta_{CA} = m * V_{REF} + b \qquad \text{Equation 1.}$$

The result of equation 1 can be applied to an integral of a sine function representing the phase voltage $V_A$ to calculate an average voltage ($V_{AVERAGE}$) over one cycle of the phase voltage $V_A$. $V_{AVERAGE}$ corresponds to the area 110 divided by 360 degrees, i.e., one cycle of $V_A$. $V_{AVERAGE}$ produced by Equation 1 is approximately proportional to $V_{REF}$, however because the phase voltage $V_A$ is generally a sine wave, rather than a triangle wave, saw-tooth wave, or a square wave, the relationship is not exactly proportional.

In another embodiment, these two parameters, $\theta_{CA}$ and $V_{REF}$, may correspond in other ways that account for the sinusoidal nature of phase voltage $V_A$. For example, the conduction angle may be calculated with the following equation (Equation 2), in which C represents a scaling constant:

$$\theta_{CA} = \cos^{-1}(C * V_{REF} + 1) \qquad \text{Equation 2.}$$

When a sine function is integrated between $\theta_{CA}$ and the next zero crossing, and the result is divided by 360 degrees, it produces a $V_{AVERAGE}$ that is proportional to $V_{REF}$. (This assumes that the phase voltage $V_A$ is sinusoidal). Increasing the degree to which these two values are proportional is believed to produce output power that more closely approximates a sine wave and reduces motor chatter.

The reference voltage $V_{REF}$ or its equivalent may be provided with a variety of techniques. For instance, in the illustrated embodiment, the reference voltage is updated periodically, at a rate that is greater than or equal to be firing rate of the controller 30, e.g. six times per supply cycle. The reference voltage may be an actual voltage, or it may be a value that varies sinusoidally, e.g., the firing angle 106 or conduction angle 108 or a corresponding delay may be calculated directly. For instance, six times or more per cycle of the phase voltage $V_A$, the controller 30 may calculate a reference value, the conduction angle 108, or the firing angle 106. The reference voltage $V_{REF}$ may be considered a type or expression of the reference value. This value may be calculated by the processor 98 or it may be retrieved from a lookup table stored in memory 100. In some embodiments, the controller 30 may receive the reference voltage $V_{REF}$ from an external source, such as a controller for a larger system in which the motor 16 operates.

The controller 30 may use the reference voltage to control each of the other phases in a manner similar to the way in which it controls phase voltage $V_A$. For example, the controller 30 may use a reference voltage with a positive, 120-degree phase shift relative to $V_{REF}$ to control the phase current $I_C$, and a reference voltage with a negative, 120-degree phase shift to control the phase current $I_B$.

In some embodiments, the controller 30 may calculate the reference voltage $V_{REF}$ or reference value based on a command from a user interface or system controller. For example, the controller 30 may determine a phase shift of the reference voltage $V_{REF}$ based on the position of the motor 16 and a desired direction of rotation, a frequency of the reference voltage $V_{REF}$ based on a desired speed of the motor 16, and an amplitude of the reference voltage $V_{REF}$ based on a desired torque to be applied by the motor 16.

Certain embodiments may vary the desired speed, torque magnitude, and torque direction in a predetermined fashion or in response to a feed-forward or feedback signal, such as a target speed from a system controller and a speed feedback signal from the motor 16. In some embodiments, the controller 30 may exercise P, PI, or PID feedback control over position, torque, or speed. Additionally, or alternatively, the controller 30 may soft start (i.e., gradually ramp up) the motor 16 by gradually increasing the frequency of the reference voltage $V_{REF}$. Similarly, the controller 30 may initiate movement of the motor 16 with a relatively large reference voltage $V_{REF}$ amplitude, corresponding to a large torque, and then decrease the amplitude of the reference voltage $V_{REF}$ after the motor 16 begins moving. Some embodiments may "home" the motor 16 to a certain position before initiating movement by exercising feedback control or feedforward control of motor position and adjusting $V_{REF}$ appropriately.

Figure 4:
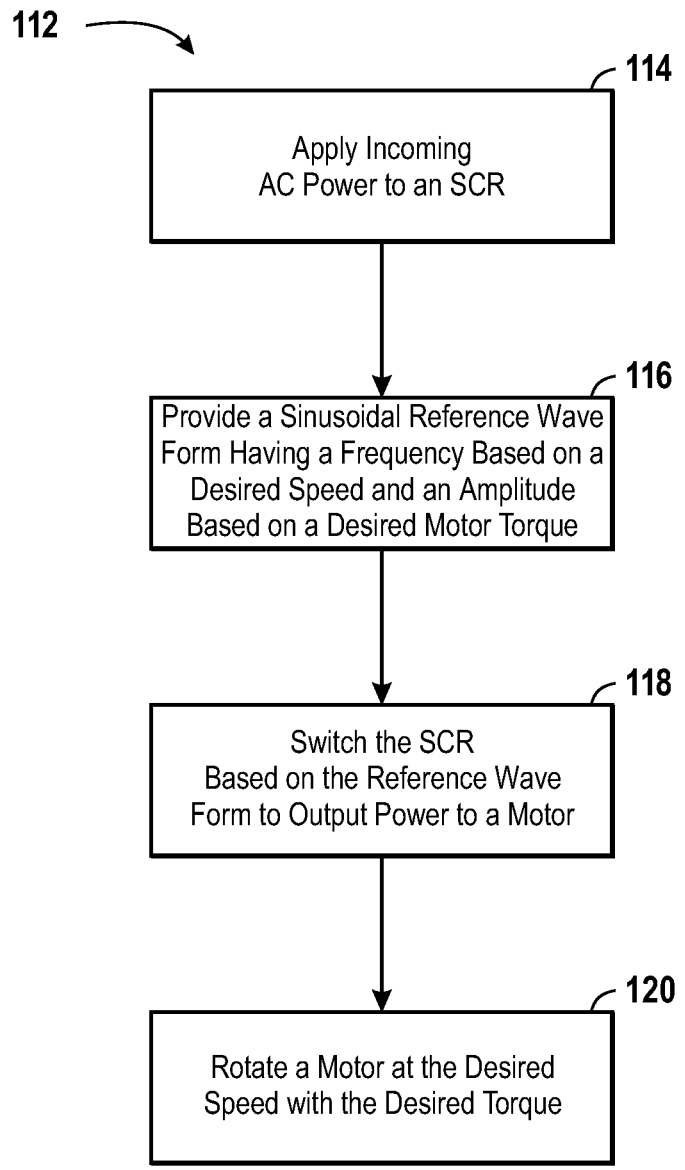
FIG. 4 illustrates an example of a control process in accordance with an embodiment of the present technique.

FIG. 4 illustrates an example of a process 112 for controlling electrical power. The illustrated process begins with applying incoming AC power to an SCR, as illustrated by block 114. Applying incoming AC power to an SCR may include applying sinusoidally varying voltage to parallel, oppositely oriented SCRs, and it may include applying three phases of AC power to three pairs of such SCRs.

The process 112 also includes providing a sinusoidal reference waveform having a frequency based on a desired motor speed and an amplitude based on a desired motor torque, as illustrated by block 116. Providing a sinusoidal reference wave may include selecting a phase shift for the reference waveform based on a desired direction of rotation and position of the motor. In some embodiments, the reference waveform may be physically expressed as a voltage or current, which may be an analog signal or which may vary in a stepwise or digital fashion. In some embodiments, the sinusoidal reference waveform may be a sinusoidally varying value from an equation that determines when to fire the SCR. Providing a sinusoidal reference waveform may also include providing generally matching sinusoidal reference waveforms that are phase shifted for each incoming AC power phase.

The process 112 includes switching the SCR based on the reference waveforms to output power to a motor, as illustrated by block 118. Switching the SCR may include determining which SCR in an SCR pair to switch based on whether the reference waveform is positive or negative. Switching may also include determining which half of a cycle of the incoming AC power to switch the SCR. Additionally, switching the SCR may include determining a conduction angle or a firing angle based on an amplitude of the waveform. In some embodiments, a portion of substantially each cycle of incoming AC power may be transmitted when the motor is being powered.

The process of 112 includes rotating a motor at the desired speed with the desired torque as illustrated by block 120. Rotating the motor may include outputting a pulse width modulated portion of the incoming AC power to the motor, where the width of the pulse varies in a sinusoidal fashion. Rotating the motor at a desired speed with the desired torque may also include measuring or determining the motor speed and exercising feedback control by adjusting the frequency and/or amplitude of the reference waveform.

In summary, certain embodiments described above may selectively transmit portions of an incoming sinusoidal AC waveform in a manner that varies sinusoidally to provide output power that varies sinusoidally at a lower frequency than the incoming waveform, e.g., less than half. As a result, in some embodiments, a load, such as an induction motor, may receive power that is tailored to a desired speed, direction, or torque.

Certain types of motor drives tailor the frequency of AC power delivered to the motor according to a desired speed, however many of these variable frequency motor drives include expensive components. Some drives use an inverter, which often includes a rectifier to convert supplied AC power to DC power and insulated gate bipolar transistors (IGBTs) to pulse-width modulate the DC power at a desired frequency. The cost of the IGBTs and the rectifier can add to the cost of the system.

Figure 5A:
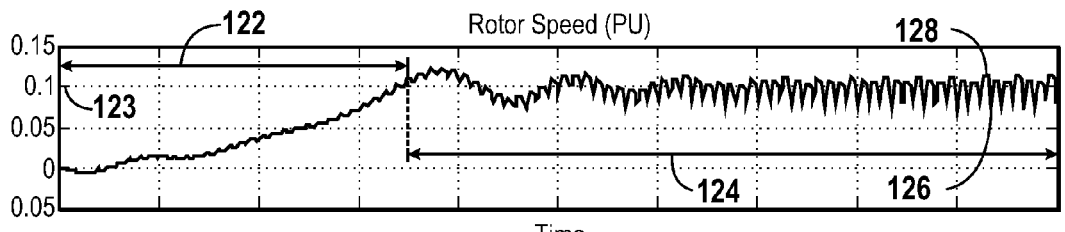
FIGS. 5A-5D illustrate motor speed, stator current, stator flux, and electromagnetic torque, respectively, when starting the induction motor system of FIG. 1.
Figure 5B:
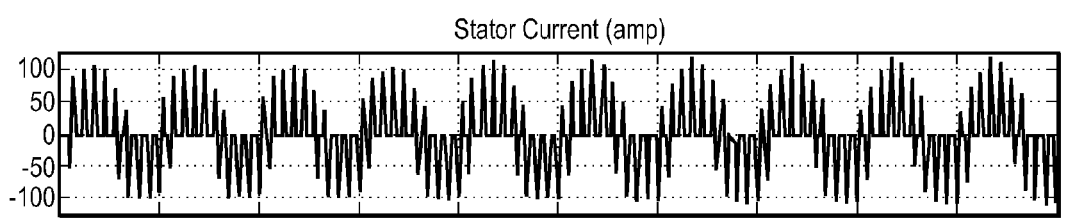
Figure 5C:
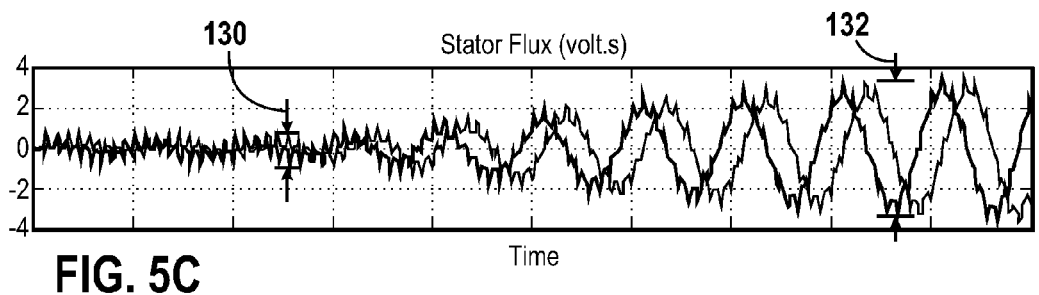
Figure 5D:
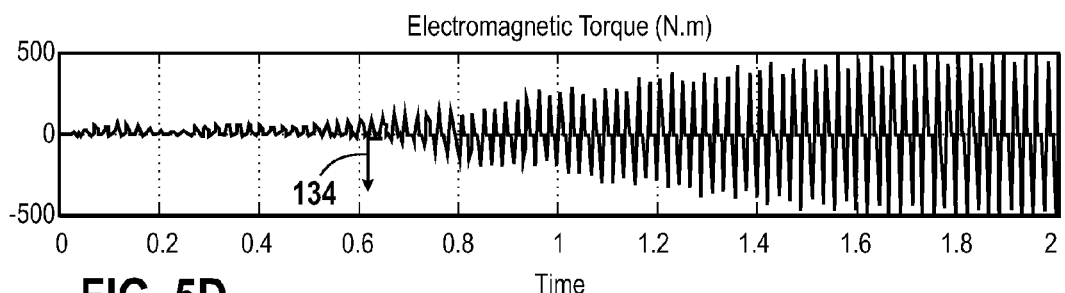

FIGS. 5A-5D illustrate various parameters of the induction motor 16 when it is started by the motor controller 12. Specifically, FIG. 5A illustrates rotor speed, FIG. 5B illustrates stator current, FIG. 5C illustrates stator flux, and FIG. 5D illustrates electromagnetic torque. Each of these parameters is depicted over time. The axis representing time in each of these figures is generally synchronized, so events that align vertically happen at generally the same time.

As mentioned, FIG. 5A is a graph of the speed of the rotor 104. Initially, the speed increases during the ramp time 122 and then levels out after it reaches the target speed 123, which the controller 30 attempts to sustain in the speed-maintenance time 124. After the ramp time 122, the rotor 104 begins to chatter with increasingly large speed oscillations, as illustrated by low point 126 and high point 128. This chatter can apply excessive mechanical pressure to other equipment, thereby potentially increasing wear in the system and maintenance costs. Additionally, generally simultaneous increases in the rotor flux and stator flux can generate excessive heat in the motor 16, thereby potentially reducing the life of the motor 16. As illustrated by FIGS. 5C and 5D, the increase in chatter correlates to both an increase in the range of stator flux from range 130 to range 132 and an onset of negative electromagnetic torque 134.

Figure 6:
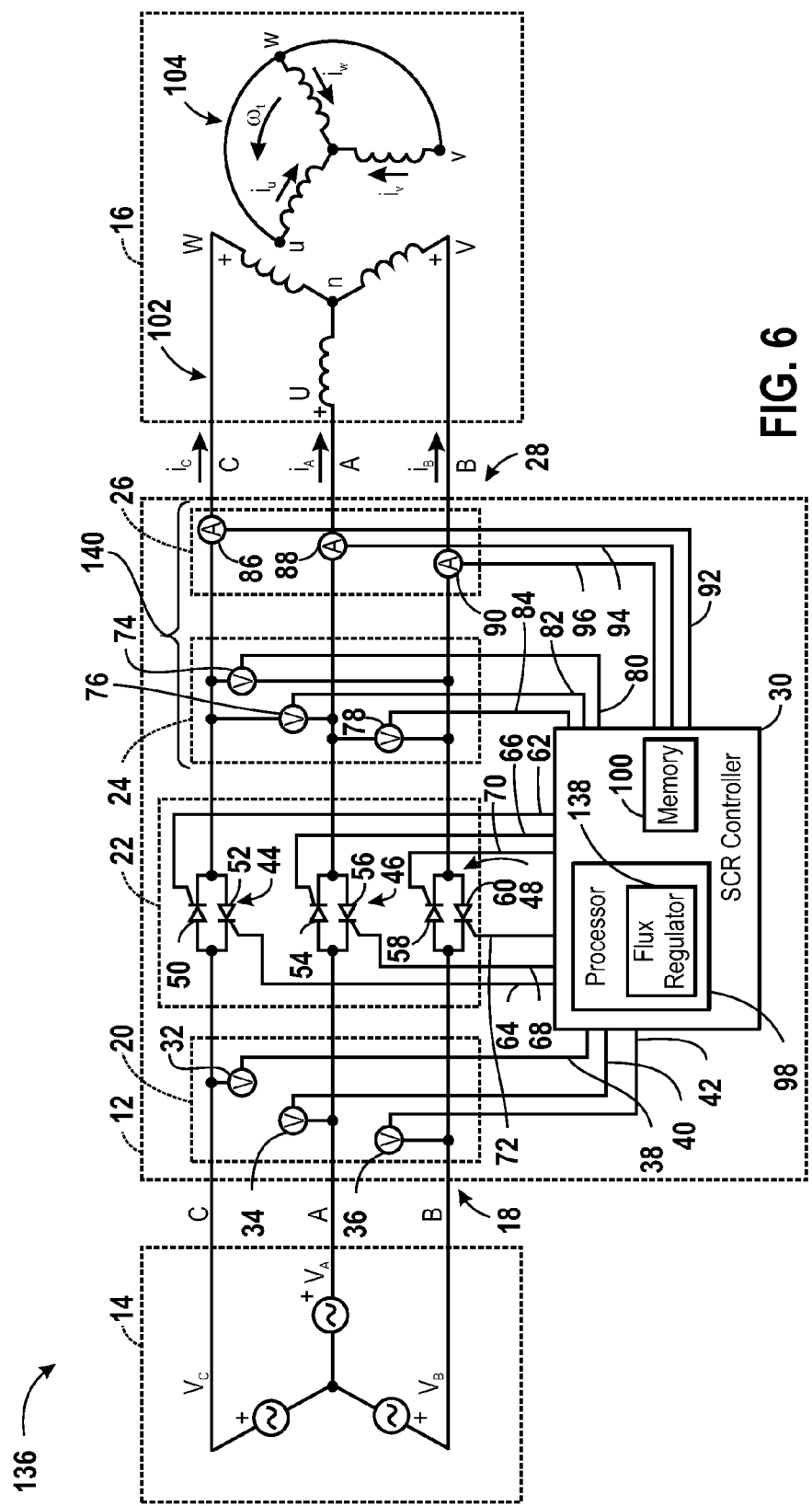
FIG. 6 illustrates another example of an induction motor system in accordance with an embodiment of the present technique.

Some of these negative effects may be reduced by an induction motor system 136 depicted in FIG. 6. The illustrated induction motor system 136 includes the features of the induction motor system 10 illustrated in FIG. 1, along with a flux regulator 138 and flux monitoring circuitry 140. As described below, the flux regulator 138, in certain embodiments, determines the stator flux based on data from the flux monitoring circuitry 140, compares the estimated stator flux to a target stator flux, and adjusts the amplitude of the reference voltage $V_{REF}$ in response to the comparison. By monitoring and controlling the stator flux, the flux regulator 138 is believed to reduce the chatter illustrated in FIG. 5A, reduce the range of stator flux illustrated in FIG. 5C, and reduce the amount of negative electromagnetic torque illustrated in FIG. 5D. Prior to describing the flux regulator 138 in detail, the components of the flux monitoring circuitry 140 are described.

In this embodiment, the flux monitoring circuitry 140 includes a motor voltage monitor 24 and a motor current monitor 26. In other embodiments, the stator flux may be measured directly with a stator flux sensor, or some other parameter that correlates to stator flux may be measured, e.g., speed, or torque.

The motor voltage monitor 24 of FIG. 6 features three motor voltage sensors 74, 76, and 78 arranged to sense the line-to-line voltage between each of the phase paths A, B, and C. The motor voltage sensors 74, 76, and 78 may couple to the phase paths A, B, and C between the switching unit 22 and the induction motor 16. Motor voltage signals 80, 82, and 84 may communicatively couple the motor voltage sensors 74, 76, and 78 to the flux regulator 138 and carry signals indicative of line-to-line voltages of the induction motor 16.

As with many of the other features discussed herein, certain embodiments may not include three motor voltage sensors 74, 76, and 78. For instance, some embodiments may include one or two voltage sensors 74, 76, or 78. Further, in some embodiments, the motor voltage monitor 24 may be integrated into the supply cycle monitor 12 and the motor voltage monitor 24 may be omitted, which is not to suggest that any other feature may not also be omitted.

The motor current monitor 26 may have three motor current sensors 86, 88, 90 each disposed in one of the phase paths A, B, or C. In various embodiments, the current sensors may be between the induction motor 16 and the switching unit 22, between the switching unit 22 and the power supply 14, or dispersed in some combination thereof, for example. Motor current signals 92, 94, and 96 communicatively couple the motor current sensors 86, 88, and 90 to the flux regulator 138 and carry signals indicative of the current through phase paths A, B, and C. It should be noted that certain embodiments may include fewer current monitors 86, 88, and 90, such as one or two.

Data from the motor voltage monitor 24 and motor current monitor 26 can be used to determine, e.g. estimate or measure, the stator flux. For example, the stator flux may be calculated with the following equation (Equation 3), in which $\vec{\psi}_s$ represents the actual stator flux vector, $\vec{u}_s$ represents the voltage across the windings of the stator, $\vec{i}_s$ represents the current through the winding, t represents time, and $R_s$ represents the resistance of the stator winding:

$$\vec{\psi}_s = \int (\vec{u}_s - R_s \vec{i}_s) dt \qquad \text{Equation 3.}$$

In some embodiments, $R_s$ is estimated, e.g., based on the type of motor or the response of the motor 16 to a stimulus, such as a surge of current or voltage. In certain embodiments, $R_s$ may be directly measured, either manually or automatically.

Because Equation 3 includes an integration over time, a DC offset in the sample voltages and currents could affect the calculation of the actual stator flux, e.g., the integral could go to infinity. To mitigate this effect, a DC offset may be calculated and subtracted from the actual stator flux produced by Equation 3. In some embodiments, the DC offset is calculated by identifying the maximum value and the minimum value of the stator flux within one cycle and averaging them to determine the DC offset.

In other embodiments, the actual stator flux may be determined with other techniques. Equation 3 is referred to as the voltage model for flux calculation, and it includes integration, which may result in sensitivity to offsets in the voltage and current signals. Other techniques may include a variation of the voltage model, such as replacing the integration with a low-pass filter and, in some embodiments, compensating for magnitude error and phase delay introduced by the low-pass filter. The low-pass filter may have a Laplace transform of $1/(s+\omega_n)$, and pure integration has a Laplace transform of $1/s$. A single-pole, low-pass filter may approximate pure integration for frequencies higher than the cutoff frequency of the filter, but a low-pass filter may be less sensitive to DC offsets than an integrator.

The actual stator flux may be compared to a target stator flux, e.g., a maximum stator flux, or a rated stator flux. In some embodiments, the target stator flux may be a specific value, a range of values less than a maximum value, a range of values greater than a minimum value, or a range of values between a minimum value and a maximum value. The target stator flux may be the rated value of the motor 16, or it could be a value less than the rated value, e.g., a value selected to increase efficiency at light load conditions. The target stator flux may be calculated based on other parameters of the motor 16. For example, the target stator flux may be calculated based on following equation (Equation 4), in which $|\vec{\psi}_s|^*$ represents the target stator flux, $V_{rated\_phase\_voltage\_amplitude}$ represents the rated phase voltage amplitude of the motor 16, and $\omega_{rated\_frequency\_in\_rad/s}$ represents the rated frequency of the motor 16 in radians per second:

$$|\vec{\psi}_s|^* = \frac{V_{rated\_phase\_voltage\_amplitude}}{\omega_{rated\_frequency\_in\_rad/s}} \qquad \text{Equation 4.}$$

These two values, the actual stator flux and the target stator flux, may be received or calculated by the flux regulator 138, and the flux regulator 138 may adjust the reference values, e.g., $V_{REF}$, to bring the actual stator flux closer to the target stator flux. To this end, the flux regulator 138 may calculate a scaling coefficient to be applied to (e.g., multiplied by) the sinusoidal reference values. For example, the flux regulator 138 may multiply the reference values by a scaling coefficient that is less than one when the actual stator flux is greater than the target stator flux. This adjustment reduces the amplitude of the sinusoidal variation in the reference values, which tends to reduce the stator current and the actual stator flux, thereby reducing the actual stator flux to a value closer to the target stator flux. Similarly, in some embodiments, scaling coefficient may be increased when the actual stator flux is less than the target stator flux. For example, in this situation, the flux regulator 138 may calculate or select a scaling coefficient that is greater than one, thereby increasing the amplitude of the sinusoidal variations in the reference values and, consequently, the magnitude of the oscillations in the current through the stator and the stator flux. Thus, a scaling coefficient greater than one, in this embodiment, raises the actual stator flux closer to the target stator flux.

The scaling coefficient may be proportional to the difference between the actual stator flux and the rated stator flux (e.g., a generally constant multiple of each other). For example, this difference may be multiplied by a proportional gain Kp, which may have a variety of values depending on the embodiment, e.g., 1 or 10.

Smaller, persistent differences between the target stator flux and the actual stator flux may be reduced by integrating this difference over time and adjusting the scaling coefficient based on an integral gain Ki. Examples of tested values for the integral gain include 1 and 10.

Figure 7:
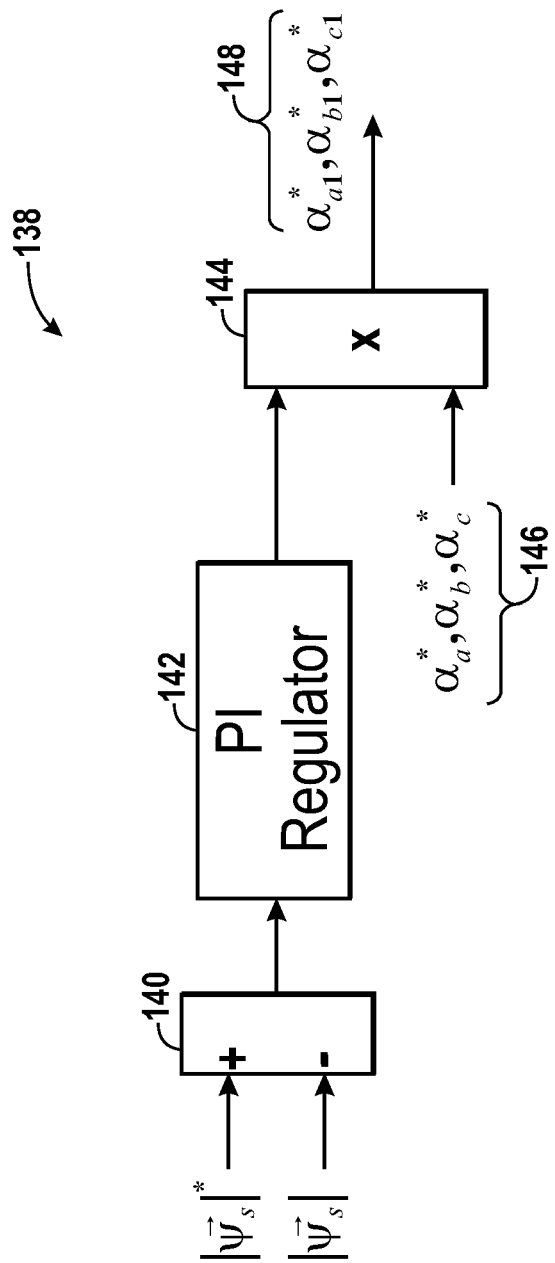
FIG. 7 illustrates an example of a flux regulator in accordance with an embodiment of the present technique.

FIG. 7 is a schematic view of the operation of the exemplary flux regulator 138. As illustrated, the presently described flux regulator 138 calculates a difference between the actual stator flux and the target stator flux, as illustrated by subtraction operator 140. The resulting difference, in this embodiment, is input to a proportional-integral (PI) regulator 142, which outputs scaling coefficient to a multiplication operator 144. The scaling coefficient is multiplied by the reference values, e.g. reference voltages $V_{REF}$, for each of the phases 146 to produce scaled reference values 148. The scaled reference values 148 may have generally the same frequency as the input reference values 146, but the amplitude of the scaled reference values 148 may be different from the amplitude of the input reference values 146 due to the scaling coefficient.

Other embodiments may include other types of control techniques, such as proportional-integral-differential control, proportional control, neural network control, or fuzzy logic control. Additionally, or alternatively, other embodiments may adjust other aspects of the reference values 146, e.g., the phase of the reference values 146 relative to the position of the motor 16 may be adjusted, the frequency of the reference values 146 may be adjusted, or a DC offset of the reference values 146 may be adjusted. In some embodiments, the flux regulator 138 may signal the SCR controller 138 to transition to another control algorithm when the difference between the target stator flux and actual stator flux exceeds a certain value, e.g., the SCR controller 138 may transition to control based on cycle skipping or the SCR controller 138 may pass close a contactor bypassing the SCRs to transmit full power to the motor 16.

Although the illustrated motor controller 12 is connected to the motor 16 in a three-phase, WYE configuration, other embodiments may include a system 10 with a different number of phases, a different winding configuration (e.g., WYE or DELTA), and a different controller 12 configuration (e.g., LINE or inside-the-DELTA).

Figure 8A:
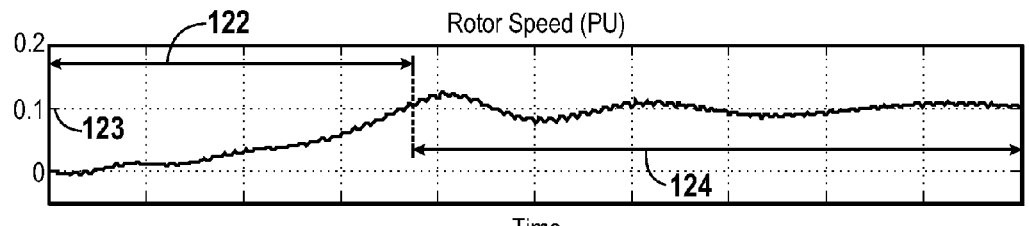
FIGS. 8A-8D illustrate motor speed, stator current, stator flux, and electromagnetic torque, respectively, when starting the induction motor system of FIG. 6.
Figure 8B:
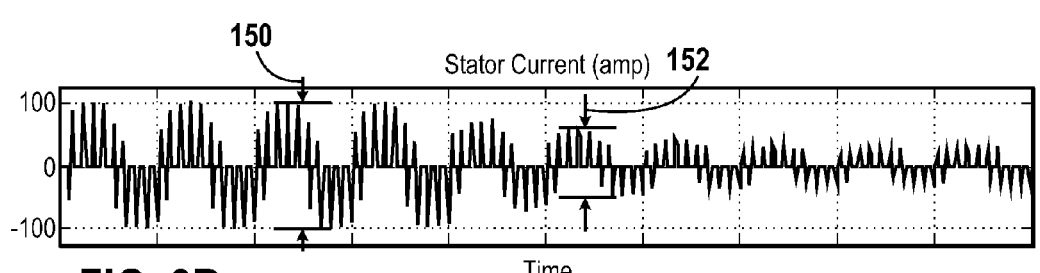
Figure 8C:
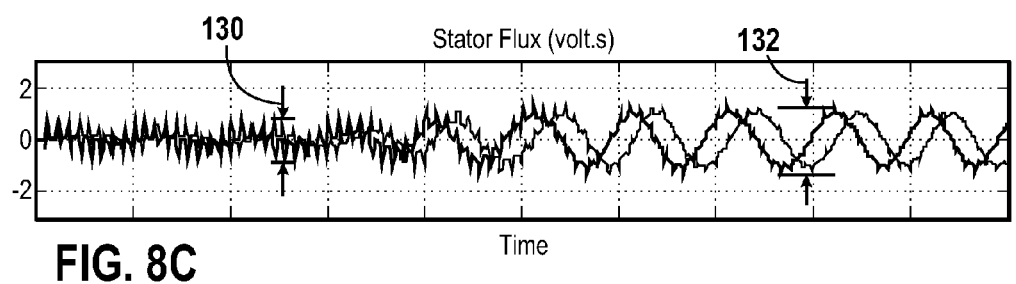
Figure 8D:
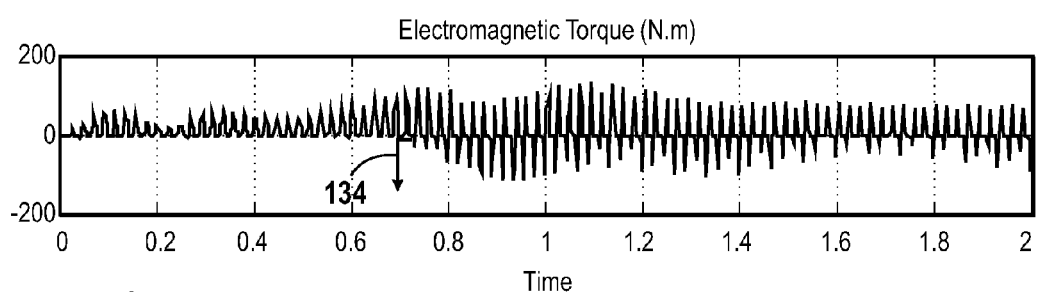

FIGS. 8A-8D illustrate various parameters of the motor 16 as the induction motor system 136 of FIG. 6 ramps up the motor 16. Specifically, FIG. 8A illustrates the speed of the rotor 104, FIG. 8B illustrates the stator current, FIG. 8C illustrates the stator flux, and FIG. 8D illustrates electromagnetic torque. As with FIGS. 5A-5D, FIGS. 8A-8D are generally synchronized with respect to their abscissa, which represents time.

FIG. 8A illustrates the effect of changes in the scaling coefficient in the magnitude of the stator current. As illustrated, the stator current has a ramp-up range 150 that decreases to speed-maintenance range 152 after the motor 16 reaches the target speed. To this end, in this embodiment, the flux regulator 138 of FIG. 6 determines that the actual stator flux increases after the motor 16 reaches the preset speed and, in response, decreases the amplitude of the stator current by decreasing the amplitude of the sinusoidal reference values. In some embodiments, the flux regulator 138 is generally inactive during the ramp up time 122 and, then, during the speed-maintenance time 124, becomes active to regulate the stator flux. Alternatively, or additionally, the target stator flux may have different values during a ramp-up time or ramp-down time than during a speed-maintenance time, e.g., the target stator flux may be larger when adjusting the speed. Similarly, the target stator flux may be adjusted when the load driven by the motor 16 changes, e.g., it may be increased when a clutch is engaged or decreased when a clutch is disengaged.

A comparison of FIGS. 5A-5D to FIGS. 8A-8D demonstrates advantages of some embodiments of the present technique. FIG. 8A shows a reduction in high frequency speed variations (i.e., chatter) in the speed-maintenance time 124, which is believed to reduce mechanical stresses within the motor 16 and equipment to which it attaches. Additionally, in the illustrated embodiment, FIG. 8C illustrates that the range of flux 132 in the stator 102 during the speed-maintenance time 124 is lower, which is believed to reduce the operating temperature of the motor 16 and extend its life. Similarly, FIG. 8D demonstrates a reduction in the magnitude of the negative electromagnetic torque 134. Thus, some embodiments of the present technique may smooth the operation of the motor 16 once the motor 16 reaches speed.

Figure 9:
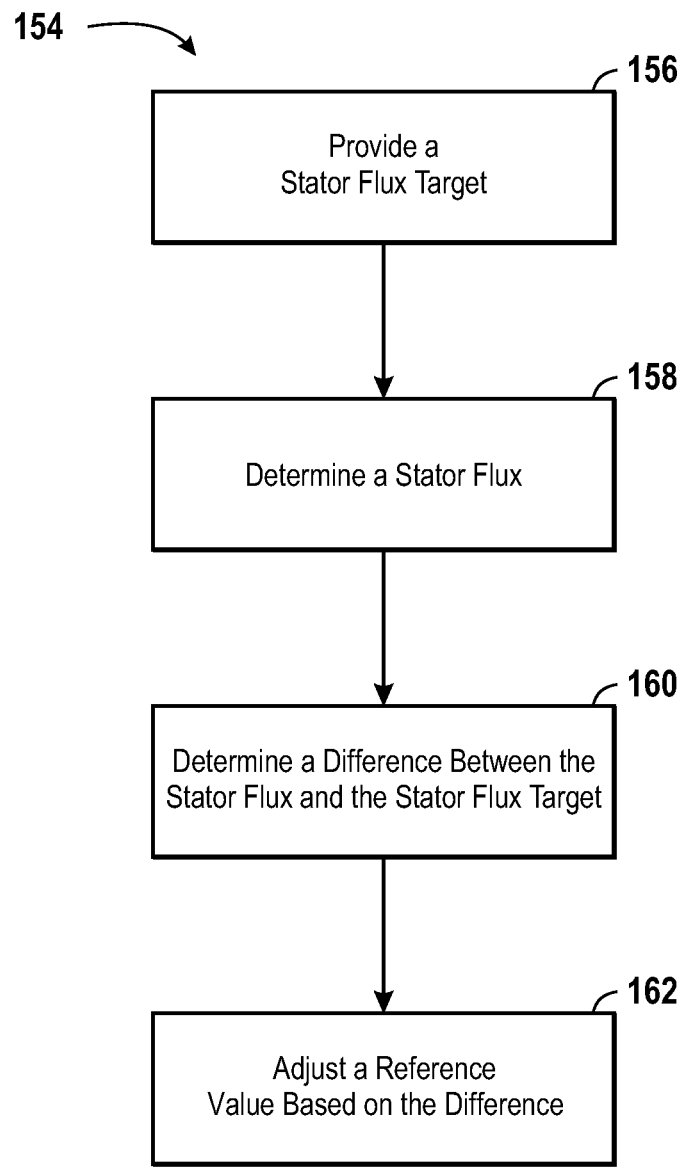
FIG. 9 illustrates an example of a flux control process in accordance with an embodiment of the present technique.

FIG. 9 illustrates a flux control process 154, which may be executed by certain embodiments of the induction motor system 136. The process 154 includes providing a stator flux target, as illustrated by block 156, and determining a stator flux, as illustrated by block 158. Additionally, the illustrated process 154 includes determining a difference between the stator flux and the stator flux target, as illustrated by block 160, and adjusting a reference value based on the difference, as illustrated by block 162. In some embodiments, a reference value may be adjusted for each phase of three phases of incoming AC power, and the adjustment needs may be proportional to the difference.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a controller coupled to a solid-state switch interposed on a phase path, wherein the controller is configured to:
switch the solid-state switch so that the solid-state switch is conductive during a conduction angle of a cycle of an incoming AC power waveform conveyed by the phase path;
determine the conduction angle, wherein the conduction angle varies generally sinusoidally over time based on a controllable reference voltage that has a frequency lower than a frequency of the incoming AC power waveform; and
adjust the controllable reference voltage based at least in part on a value indicative of flux in a load coupled to the phase path.

2. The system of claim 1, wherein adjusting the controllable reference voltage comprises decreasing an amplitude of the controllable reference voltage if the load flux is larger than a target load flux value.

3. The system of claim 1, wherein the controller is configured to adjust the controllable reference voltage based at least in part on a difference between a target motor flux and a motor flux.

4. The system of claim 3, wherein the controller is configured to integrate the difference between the target motor flux and the motor flux over time, to determine an integral gain, and to adjust the controllable reference voltage based at least in part on the integral gain.

5. The system of claim 1, wherein the controller comprises motor-flux monitoring circuitry coupled to the phase path.

6. The system of claim 5, wherein the motor-flux monitoring circuitry comprises a current sensor and a voltage sensor.

7. A method, comprising:
selectively transmitting a portion of cycles of AC power during a conduction angle of each cycle, wherein the conduction angle varies generally sinusoidally at a lower frequency than the AC power and is controlled by a controllable reference voltage that has a lower frequency than the AC power; and
controlling the controllable reference voltage based at least in part on feedback indicative of a parameter of a load.

8. The method of claim 7, comprising:
determining a difference between the parameter of the load and a target parameter of the load; and
controlling the controllable reference voltage based at least in part on the difference and a scaling coefficient.

9. The method of claim 8, comprising:
determining an integral gain by integrating the difference between the target parameter of the load and the parameter of the load over time, and
adjusting the controllable reference voltage based at least in part on the integral gain.

10. The method of claim 7, wherein the feedback is indicative of a change in speed of a motor.

11. The method of claim 7, wherein the feedback is indicative of flux in a stator of an induction motor.

12. The method of claim 7, wherein a half of each cycle of AC power in which the conduction angle occurs depends on whether the controllable reference voltage is positive or negative.

13. The method of claim 7, wherein selectively transmitting a portion of AC power comprises switching an SCR to a conductive state.

* * * * *